US012803827B2

(12) United States Patent
Wu et al.

(10) Patent No.: US 12,803,827 B2
(45) Date of Patent: Nov. 17, 2026

(54) KEY DERIVATION FOR ACCOUNT MANAGEMENT

(71) Applicant: Provable Inc., Reno, NV (US)

(72) Inventors: Howard Wu, Reno, NV (US); Pratyush Mishra, Dublin, CA (US)

(73) Assignee: Provable Inc., Reno, NV (US)

( * ) Notice: Subject to any disclaimer, the term of this patent is extended or adjusted under 35 U.S.C. 154(b) by 0 days.

(21) Appl. No.: 19/077,981

(22) Filed: Mar. 12, 2025

(65) Prior Publication Data

US 2025/0337602 A1 Oct. 30, 2025

Related U.S. Application Data

(63) Continuation of application No. 18/061,783, filed on Dec. 5, 2022, now Pat. No. 12,289,419.

(51) Int. Cl.

| | |
|---|---|
| ***H04L 9/08*** | (2006.01) |
| ***H04L 9/00*** | (2022.01) |
| ***H04L 9/32*** | (2006.01) |

(52) U.S. Cl.

CPC .............. *H04L 9/50* (2022.05); *H04L 9/0861* (2013.01); *H04L 9/3218* (2013.01)

(58) Field of Classification Search

CPC ....... H04L 9/50; H04L 9/0861; H04L 9/3218; H04L 9/0869; H04L 2209/56; H04L 9/3239; H04L 9/3247

See application file for complete search history.

(56) References Cited

U.S. PATENT DOCUMENTS

| | | | | |
|---|---|---|---|---|
| 11,164,165 B1 | | 11/2021 | Andreev | |
| 11,190,338 B1 | * | 11/2021 | Corey | H04L 9/0618 |
| 12,073,401 B2 | * | 8/2024 | Oh | G06Q 20/065 |
| 2023/0245117 A1 | * | 8/2023 | Higgins | H04L 9/50 705/39 |

FOREIGN PATENT DOCUMENTS

| | | |
|---|---|---|
| CN | 111008228 | 4/2020 |
| CN | 113875185 | 12/2021 |
| KR | 20200087913 | 7/2020 |
| KR | 20210027332 | 3/2021 |
| WO | 2020258851 | 12/2020 |
| WO | 2022037868 | 2/2022 |

OTHER PUBLICATIONS

Bowe et al., ZEXE: Enabling Decentralized Private Computation, IEEE Symposium on Security and Privacy, May 18, 2020m pp. 947-964.

Wu et al., DIZK: A Distributed Zero Knowledge Proof System, 27th USENIX Security Symposium, Aug. 15, 2018, pp. 675-692, https://www.usenix.org/system/files/conference/usenixsecurityl8/secl8-wu.pdf.

* cited by examiner

*Primary Examiner* — Amie C. Lin

(74) *Attorney, Agent, or Firm* — Van Pelt, Yi & James LLP

(57) ABSTRACT

Key derivation for account management is disclosed, including: generating an account private key associated with a new account; generating a compute key associated with the new account based at least in part on the account private key, wherein the compute key is usable to verify a new transaction to be confirmed on a blockchain, and wherein the new transaction is initiated by the new account; and generating a view key associated with the new account based at least in part on the account private key, wherein the view key is usable to decrypt a portion of a confirmed transaction on the blockchain that belongs to the new account.

17 Claims, 9 Drawing Sheets

KEY DERIVATION FOR ACCOUNT MANAGEMENT

CROSS REFERENCE TO OTHER APPLICATIONS

This application is a continuation of U.S. patent application Ser. No. 18/061,783, entitled KEY DERIVATION FOR ACCOUNT MANAGEMENT filed Dec. 5, 2022 which is incorporated herein by reference for all purposes.

BACKGROUND OF THE INVENTION

Transactions on a blockchain are typically publicly viewable. As such, a blockchain can be traversed to reveal the activities and the amounts of tokens that are associated with each account. However, having such information be publicly consumable is detrimental to preserving the privacy of the users of the accounts. It would be desirable to enable transactions on a blockchain to preserve the privacy and therefore security of the accounts that participate in the blockchain.

BRIEF DESCRIPTION OF THE DRA WINGS

Various embodiments of the invention are disclosed in the following detailed description and the accompanying drawings.

DETAILED DESCRIPTION

Figure 1:
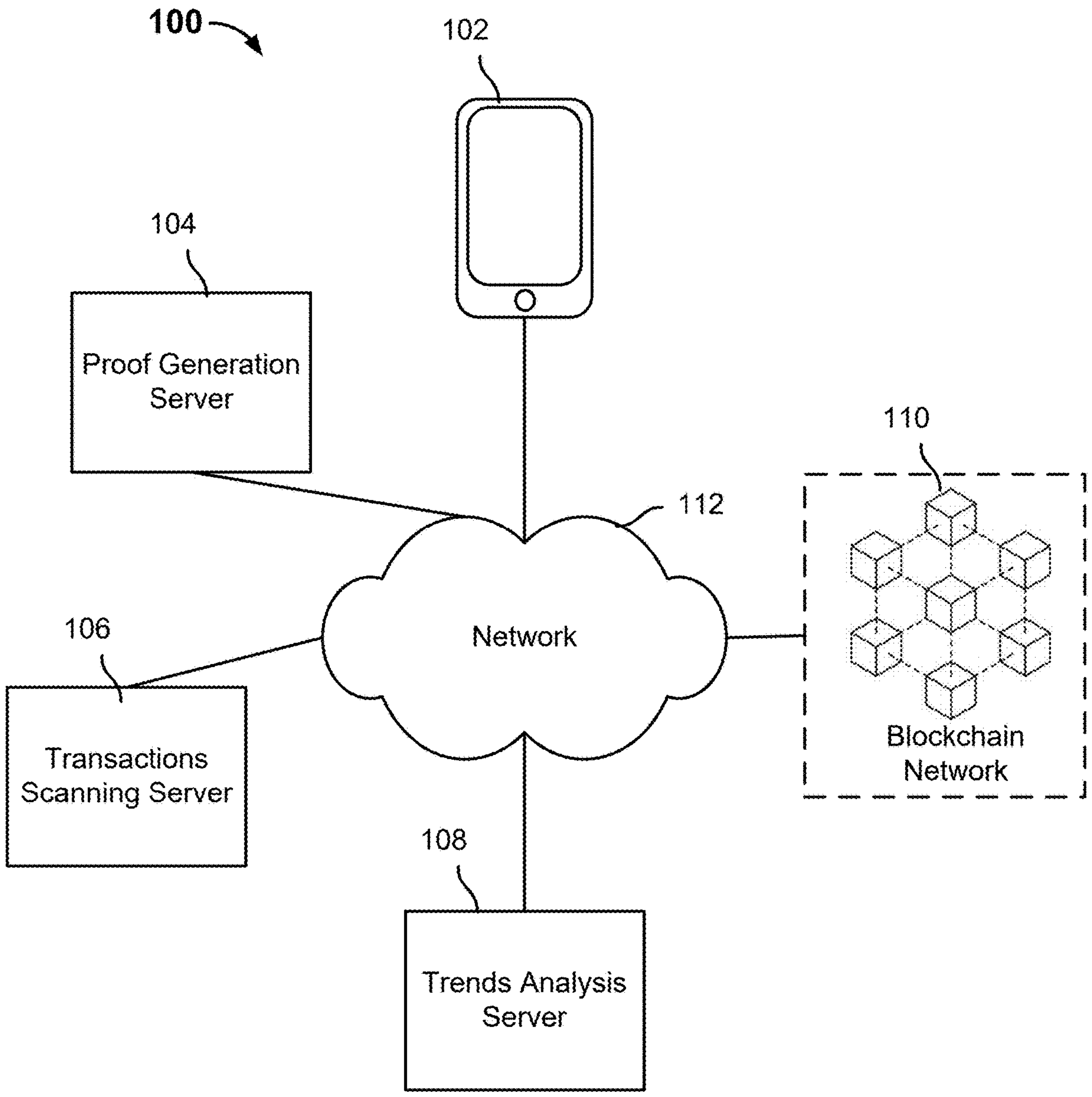
FIG. 1 is a diagram showing an embodiment of a system for generating and using key derivations for account management.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of key derivation for account management are described herein. In various embodiments, a request to open a new account with which to engage in transactions on a blockchain is received. In response to the request, an "account private key" associated with the new account is generated. A "compute key" associated with the new account is then generated based at least in part on the account private key. Furthermore, a "view key" associated with the new account is then generated based at least in part on the account private key. As will be described in further detail below, the compute key is usable to verify a new transaction to be confirmed on the blockchain and where the new transaction is initiated by the new account. The view key is usable to decrypt a portion of a confirmed transaction on the blockchain that belongs to the new account. In various embodiments, each of the compute key and the view key can be separately used to derive an "account address," which can also be referred to a "public key," that publicly identifies the new account. Whereas the account private key can perform all the functions associated with the derivative keys (e.g., the compute key and the view key) that are derived from it and is therefore highly sensitive, none of the derivative keys can be used either individually or in combination, to recover the account private key. Furthermore, each of the derivative keys can not be used to recover any of the other keys that were directly derived from the account private key nor perform a function associated with any other derivative key. By separating/splitting the functionalities of the account private key of an account into several derivative keys, the derivative keys could potentially be delegated to trusted third parties to perform distinct functionalities with respect to transactions on the blockchain on behalf of the account without the need to directly share the highly sensitive account private key.

FIG. 1 is a diagram showing an embodiment of a system for generating and using key derivations for account management. As shown in FIG. 1, system 100 includes client device 102, proof generation server 104, transactions scanning server 106, trends analysis server 108, blockchain network 110, and network 112. Network 112 includes data and/or telecommunications networks.

Client device 102 is configured to execute computer program code associated with a stand-alone software application or a web-browser based application that is configured to generate and use cryptographic keys associated with managing an account that participates in transactions on blockchain 110. Examples of client device 102 can be a mobile device, a laptop computer, a desktop computer, a tablet device, or any other computing device. A user (not shown) can interact with a user interface associated with the application executing at client device 102 to open a new account. In response to the user input to open a new account, the application is configured to generate a new "account private key" (which is sometimes referred to simply as "private key"). In some embodiments, the new private account key is generated based on a seed value as well as hashes that are determined based on concatenations including the seed value. As will be described in further detail below, the new private account key may comprise two or more elements (e.g., each element can be represented by 32 bytes). The user's (the new account holder's) account private key can be used to perform a wide range of functions with respect to transactions on blockchain 110. Some examples of such functions include authorizing transactions (e.g., the spending of tokens that are associated with the new account), decrypting portions of confirmed transactions on blockchain 110 to determine which transactions are related to the new account, and determining a pattern associated with confirmed transactions on blockchain 110 that are initiated by the new account. As such, the account private key is a powerful and sensitive piece of information that ideally, should not be shared with other users or devices to reduce the risk of unauthorized transactions associated with the new account.

After an account private key is generated for a new account by the application executing at client device 102, the application is configured to directly or indirectly derive, from the account private key, one or more other keys that correspond to that new account. A first key corresponding to the new account and that can be derived from the account private key is the "account compute key" or simply "compute key." The compute key can be included in each account signature and is used to execute zero-knowledge proofs associated with a transaction. In various embodiments, the compute key can also be used to validate a signature associated with a transaction that is initiated using the account private key. The compute key should only be shared with trusted parties. A second key corresponding to the new account and that can be derived from the account private key is the "account view key" or simply "view key." The view key can be used to decrypt all transactions that belong to the new account. The view key should only be shared with trusted parties. Neither the view key nor the compute key can perform each other's capabilities/functions. In some embodiments, a third key corresponding to the new account and that can be derived from the view key, which is derived from the account private key, is the "account graph key" or just "graph key." The graph key can be used to compute tags to be included in transactions and then the tags can be used to identify transactions, at a high-level, that belong to the new account for the detection of patterns (e.g., in the spend of tokens) across the transactions. The graph key should only be shared with trusted parties. A fourth key corresponding to the new account and that can be derived from the view key, which is derived from the account private key, is the "account address", "address," or the "public key." The address is the public identifier of the new account and can be shared publicly. For example, another account that wants to perform a transaction with the new account will need to specify the new account's address in the transaction. The new account's address can be shared with another device from which a transaction is to originate, for example.

To initiate a transaction that is to be confirmed by blockchain network 110, the user of the new account will input, into a user interface of the application executing at client device 102, parameters associated with the transaction. For example, if the transaction pertained to the spending tokens associated with the new account, then parameters associated with that transaction may include identifying information associated with one or more confirmed records at blockchain network 110 that document what the new account possesses. These confirmed records will be included by the application into the transaction as one or more input records. Furthermore, in this example, the user input parameters would also include at least the amount of tokens that the user wishes to send to a recipient party and at least one output record (that is to be confirmed by blockchain network 110) that specifies the account address (public key) of the recipient party, a program to be executed, and the amount of tokens to be sent to the recipient party, which will be included by the application into the transaction as an output record. In some embodiments, each output record is also encrypted using the recipient account address that is included in that output record. In various embodiments, a signature is generated by the application at client device 102 based at least the locally generated account private key corresponding to the new account and at least a portion of the transaction (e.g., the input record(s) and/or the output record(s)). In some embodiments, the application executing at client device 102 is further configured to generate a zero-knowledge proof using the signature, the compute key, and at least a portion of the input and/or output records (e.g., the account address/public key of the new account that initiated the transaction). In this context, the "zero-knowledge proof" verifies that the signature in fact belongs to the user associated with the new account without revealing to a verifier (e.g., the nodes of blockchain network 110) the signature itself (or the compute key and the content of the records). In some embodiments, a tag is generated by the application at client device 102 based at least the graph key corresponding to the new account and at least a portion of the transaction (e.g., the output record(s)). The tag can be used by a holder of the graph key to identify transactions that are associated with the new account but does not provide the details of such transactions (e.g., because the output records of such transactions are encrypted and cannot be decrypted using the graph key). In various embodiments, the transaction comprising the set of input record(s), the set of output records, the zero-knowledge proof, and, optionally, the tag(s) is sent by client device 102 to blockchain network 110 for the nodes of blockchain network 110 to confirm and therefore, verify the output record(s) and add the valid/confirmed output record(s) to the ledger.

As mentioned above, during the process of creating a transaction initiated by the holder of the new account at client device 102, a zero-knowledge proof is needed to be generated using a signature that is associated with the new account. Generating a zero-knowledge proof can be computationally intensive, especially when client device 102 is a mobile device with limited computation resources. As such, in some embodiments, client device 102 can delegate/offload the process of generating a zero-knowledge proof associated with a transaction to a third-party server such as proof generation server 104 by sending to proof generation server 104 at least the signature and/or a portion of the transaction, the compute key, and/or data derived from the signature and/or the transaction, for proof generation server 104 to either generate the entire zero-knowledge proof or complete a latter phase of the generation of the zero-knowledge proof. Therefore, proof generating server 104 can generate at least a portion of the zero-knowledge proof to free up resources at client device 102 and then send the generated proof to client device 102.

After transactions that are initiated by parties other than the holder of the new account at confirmed by blockchain network 110, the application executing at client device 102 can use the locally derived view key corresponding to the new account to determine which, if any, of confirmed transactions pertain to the new account. As mentioned above, during the process of creating a transaction initiated by the holder of the new account (the sender account) at client device 102, the output record of a transaction that describes the nature of the transaction and the transaction recipient has been encrypted using the recipient's account address (the recipient's public key). The encrypted output record can only be decrypted and viewed using the view key that corresponds to the same account and therefore, only entities that have copies of that view key can decrypt the encrypted output records of transactions and learn the nature of those transactions (e.g., how many tokens were sent to the recipient by a corresponding sender account). Put another way, entities that do not have the view key that corresponds to a recipient account of the encrypted output records of confirmed transactions cannot decrypt those output records. By using asymmetric encryption in this manner, entities other than those that have been entrusted with copies of the view key corresponding to an account cannot see/learn of transactions to which that account is a party.

While the application executing at client device 102 can (periodically) download the encrypted output records of transaction confirmed by blockchain network 110 and then use the locally derived view key to determine which, if any, of the output records that it can decrypt, in some embodiments, the application can delegate the service of checking which confirmed transactions to which the new account is a recipient to a third-party server such as transactions scanning server 106. For example, to delegate the service of checking which confirmed transactions to which the new account is a recipient to transactions scanning server 106 includes sending the view key to transactions scanning server 106 so that can transactions scanning server 106 can continuously (e.g., at regular intervals or in response to events) download the encrypted output records of confirmed transactions from blockchain network 110 and then use the obtained view key to determine which of those output records can be decrypted using the view key. Then, for those output records that transactions scanning server 106 can decrypt, transactions scanning server 106 can determine the nature of those transactions to which the new account is a recipient and then send messages (e.g., in the form of push notifications) to client device 102 to inform the account holder of these transactions. This way, transactions scanning server 106 can continue to scan (e.g., newly) confirmed transactions at blockchain network 110 to determine those that are relevant to the new account, even when client device 102 is offline (e.g., not downloading confirmed output records from blockchain network for whatever reason).

As mentioned above, during the process of creating a transaction initiated by the holder of the new account at client device 102, a tag can be generated using a graph key corresponding to the new account and also included in the transaction. In some embodiments, client device 102 can delegate the service of checking for trends/patterns among transactions with tags that are generated based on the graph key to a third-party server such as trends analysis server 108. For example, to delegate the service of checking for trends/patterns among transactions with tags that are generated based on the graph key includes sending the graph key to trends analysis server 108 so that trends analysis server 108 can download confirmed transactions from blockchain network 110 and determine those that include tags that are determined based on the graph key. Trends analysis server 108 is configured to audit the transactions, for example, by analyzing (e.g., by applying a machine learning model and/or using clustering) the transactions to determine patterns among the transactions that include a tag that is generated by the graph key. For example, the patterns could indicate anomalous transactions that may be indicative of hacking or other undesirable behavior. With only the graph key but not also the view key corresponding to the new account, however, trends analysis server 108 cannot decrypt and view the details of the encrypted output records of the transactions. In some instances, trends analysis server 108 could alert another entity (e.g., client device 102 or transactions scanning server or another server) that holds the view key to those transactions that it has determined as being anomalous so that the informed entity can use the view key to decrypt the encrypted output records of those transactions to more closely examine those transactions for whether they are indicative of suspicious behavior.

As such in system 100, the keys derived from an account private key that is associated with an account can be used to split up various capabilities that can be performed by the account private key. However, these derivative keys cannot perform each other's capabilities or be used to individually recover the account private key. As such, the derivative keys can be shared with different trusted parties to delegate/offload services to be performed by these parties without concern that these parties can recover the account private key. By deriving and using the derivative keys from the account private key as described in various embodiments herein, leaks of the highly sensitive account private key can be prevented while still providing the flexibility of potentially leveraging third parties to perform at least some of the tasks associated with account management with respect to transactions at a blockchain on behalf of an account.

Figure 2:
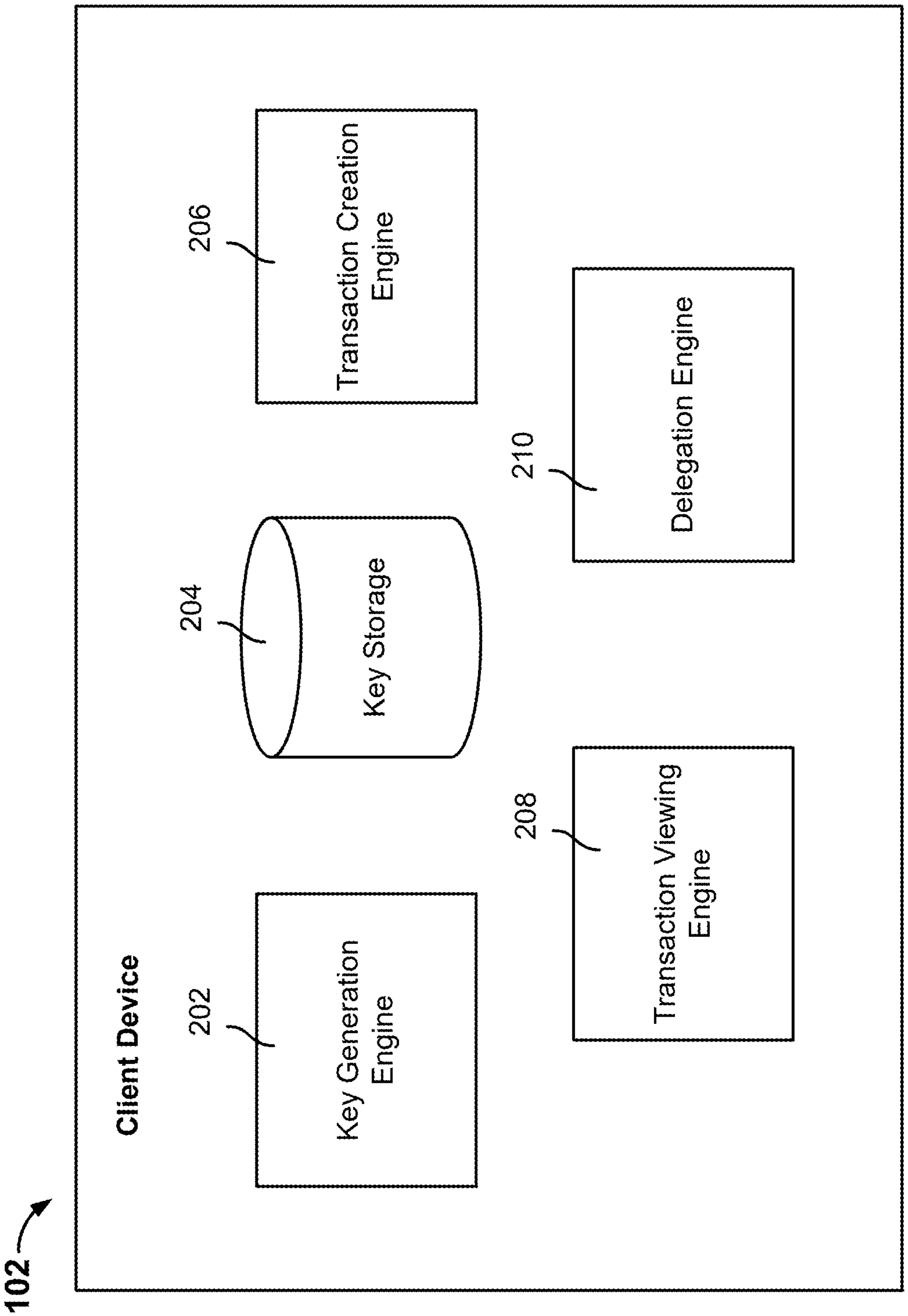
FIG. 2 is a diagram showing an example of a client device in accordance with some embodiments.

FIG. 2 is a diagram showing an example of a client device in accordance with some embodiments. In some embodiments, client device 102 of system 100 of FIG. 1 can be implemented using the example client device of FIG. 2. As shown in FIG. 2, the client device includes key generation engine 202, key storage 204, transaction creation engine 206, transaction viewing engine 208, and delegation engine 210. Each of key generation engine 202, key storage 204, transaction creation engine 206, transaction viewing engine 208, and delegation engine 210 can be implemented using software and/or hardware.

Key generation engine 202 is configured to generate an account private key for an account (e.g., in response to a request to generate a new account). After generating the account private key for an account, key generation engine 202 is configured to derive keys directly from the account private key including a view key and a compute key corresponding to the account. The view key can be used to decrypt output record(s) associated with transactions that have been confirmed by a blockchain network. The compute key can be used to validate a signature associated with a transaction that is initiated using the account private key. In some embodiments, key generation engine 202 is confirmed to derive a graph key corresponding to the account from the view key. The graph key is used to generate a tag based on record(s) associated with a transaction and is used to identify that transaction to a holder of the graph key but not decrypt those records for those without the view key. Key generation engine 202 can derive an account address (a public key) corresponding to the account from either the view key or the compute key. Unlike the other keys corresponding to the account, the account address is a public identifier of the account and can be freely shared with others (e.g., so that they can use the account's address to initiate a transaction that involves the account). For example, key generation engine 202 can share the account's account address by sending it to one or more other devices at which another account holder can be a counter party in a transaction with the holder of the account address.

Key storage 204 is configured to store all the keys (e.g., locally generated by key generation engine 202) that are related to each account. For example, the keys related to each account include the account private key, the compute key, the view key, the graph key, and the account address (account public key). The keys that correspond to an account may be locally used at the client device to create a transaction and/or view a confirmed transaction. Copies of at least some of the keys that corresponding to the account may also be sent to third-party servers (e.g., by delegation engine 210) so that the third-party servers can perform computationally intensive services for the behalf of the account and/or leverage a service that is offered by the third-party servers.

Transaction creation engine 206 is configured to create a transaction that is initiated by the account holder using the account private key. To initiate a transaction, the account holder may input parameters that identify zero or more already confirmed records in the public ledger of the blockchain as input record(s). Further to initiate a transaction, the account holder may also input parameters for one or more output records that detail what/who is to be effected by the transaction, such as the account address of a recipient party to the transaction and the nature of the transaction (e.g., the transfer of tokens or the execution of a smart contract). In various embodiments, transaction creation engine 206 is configured to encrypt each output record(s) using the recipient account address (that is also included in that output record) so that only those with the view key associated with the recipient account address can decrypt and view the contents of the output records after the transaction is confirmed by the blockchain network. In some embodiments, transaction creation engine 206 is configured to generate a cryptographic signature corresponding to the transaction using the account private key and at least a portion of the record(s) included in the transaction. In some embodiments, transaction creation engine 206 is configured to input the signature associated with the transaction along with at least the compute key corresponding to the account to a zero-knowledge proof generation technique so that a zero-knowledge proof can be generated to prove (e.g., to a verifier comprising node(s) at the blockchain network) that the signature indeed belongs to the account holder associated with the sender account address that is included in the transaction. Put another way, the zero-knowledge proof proves that the sender account did authorize the transaction. In some embodiments, transaction creation engine 206 is configured to generate either record-level tags or transaction-level tags corresponding to the transaction using the graph key corresponding to the account. Transaction creation engine 206 is configured to "mark" a transaction by including this tag into the transaction so that the tag can be later be used to identify the transaction as belonging to the sender account of the transaction. As will be further described below, transaction creation engine 206 is configured to create a transaction that includes zero or more confirmed input records, one or more not yet confirmed output records, (optionally) a tag, and a zero-knowledge proof and then send this transaction to the blockchain network to be confirmed so that its output records can be added to the ledger.

Transaction viewing engine 208 is configured to use the view key corresponding to the account to attempt to decrypt encrypted output records associated with transactions that have been confirmed on the blockchain to determine those output records, if any, that identified the account as a recipient to the transaction. In some embodiments, transaction viewing engine 208 is configured to periodically or in response to an event (e.g., a user instruction to check) download output records associated with (recently) confirmed transactions at the blockchain. Then transaction viewing engine 208 is configured to attempt to decrypt the encrypted output record(s) associated with each confirmed transaction to determine whether that output record can be decrypted. As mentioned above, the sender/creator of a transaction will encrypt each output record of the transaction using the account address (public key) of the recipient party of that output record and that encrypted output record can only be decrypted using the view key of the recipient party. As such, transaction viewing engine 208 can only decrypt, using the view key of the account, output records that have been encrypted using the account address of that account. Put another way, transaction viewing engine 208 can only successfully decrypt encrypted output records to which the account holder of the view key is a recipient party. In some embodiments, for each output record that transaction viewing engine 208 successfully decrypts, transaction viewing engine 208 is configured to generate and present a prompt at a display (not shown) of the client device to inform the user/account holder what type of transaction to which the user has been determined to be a recipient. For example, if an output record, which was successfully decrypted by transaction viewing engine 208, indicated that a sender party had sent five tokens to the user, then transaction viewing engine 208 is configured to present a message or prompt at the display of the client device that the user has received five tokens from a sender party (e.g., which can be determined by transaction viewing engine 208 from an input record of the same transaction because the input record has not been encrypted and is therefore viewable).

Delegation engine 210 is configured to send copies of the keys derived from the account's account private key or data derived from those keys, to other devices or servers in the process of delegating services to be performed by those other entities in processes, such as, for example, transaction creation, transaction viewing, and transaction trends analysis. In a first example of delegation, as mentioned above, during the process of creating a transaction (e.g., as performed by transaction creation engine 206) that is initiated by the account holder, a zero-knowledge proof is needed to be generated based on one or more of the following: a signature derived from the account private key, the compute key derived from the account private key, the account address associated with the account, and at least a portion of the records associated with the transaction. However, generating a zero-knowledge proof can be resource intensive and as such, delegation engine 210 can delegate the generation of this proof to a third-party server (e.g., proof generation server 104 of FIG. 1). For example, delegation engine 210 can delegate the generation of the zero-knowledge proof to a third-party server in response to a user instruction or in response to a determination of less than a predetermined threshold of available computation resources being locally available at the client device. To delegate the generation of the zero-knowledge proof to a third-party server, delegation engine 210 is configured to send one or more of the signature, the compute key, and at least a portion of the transaction to the third-party server. After the zero-knowledge proof is received from the third-party server, delegation engine 210 is configured to send the proof to transaction creation engine 206 so that transaction creation engine 206 can complete the transaction before sending it to the blockchain network for confirmation.

In a second example of delegation, to view transactions that are related to the account (e.g., which can be performed by transaction viewing engine 208), output records of newly confirmed transactions are continuously downloaded from the blockchain and then which of those can be decrypted using the view key corresponding to the account is determined. However, continuous monitoring of newly confirmed transactions at the blockchain may also be resource intensive if there is a great volume of such transactions or if the client device is not able to connect to the blockchain for whatever reason. As such, delegation engine 210 can delegate the checking for relevant transactions to a third-party service. For example, delegation engine 210 can delegate the monitoring of transactions to a third-party server in response to a user instruction or in response to a determination of less than a predetermined threshold of available computation resources being locally available at the client device. To delegate the monitoring of transactions to a third-party server, delegation engine 210 is configured to send the view key to a third-party server (e.g., transactions scanning server 106 of FIG. 1). That way, the third-party server can continue to check for transactions that are relevant to the account even when the client device is offline (e.g., not connected to the blockchain). When the third-party server determines that a transaction that is relevant to the account (because the transaction includes at least one output record that can be decrypted using the view key), then the third-party server can send at least a portion of the decrypted output record to transaction viewing engine 208 to display a prompt or message (e.g., a push notification) at the display of the client device.

In a third example of delegation, to check for trends but not necessarily view the data associated with transactions related to the account, the graph key corresponding to the account can be used to re-generate a tag associated with the account and identify transactions that include the tag as being related to the account. Because generating these account-related tags using the graph key, finding transactions confirmed by the blockchain, and then analyzing the patterns of the transactions can be resource intensive and/or of interest to a third-party, such as an auditor, delegation engine 210 can delegate the service of analyzing trends in such transactions to a third-party server. To delegate the analysis of trends in transactions to a third-party server, delegation engine 210 is configured to send the graph key to a third-party server (e.g., trends analysis server 108 of FIG. 1). That way, the third-party server can use the graph key to generate tags and find transactions that include such tags and then analyze the transactions for trends or anomalous behavior. When the third-party server determines transactions that may be indicative of anomalous activity, then the third-party server can send a message informing the user of such to the client device and for example, the user instruct input an instruction to cause delegation engine 210 to send the view key along with the flagged transactions to another third-party server for the second third-party server to decrypt the transactions to examine the nature of the transactions to confirm whether any malicious activity was involved.

Figure 3:
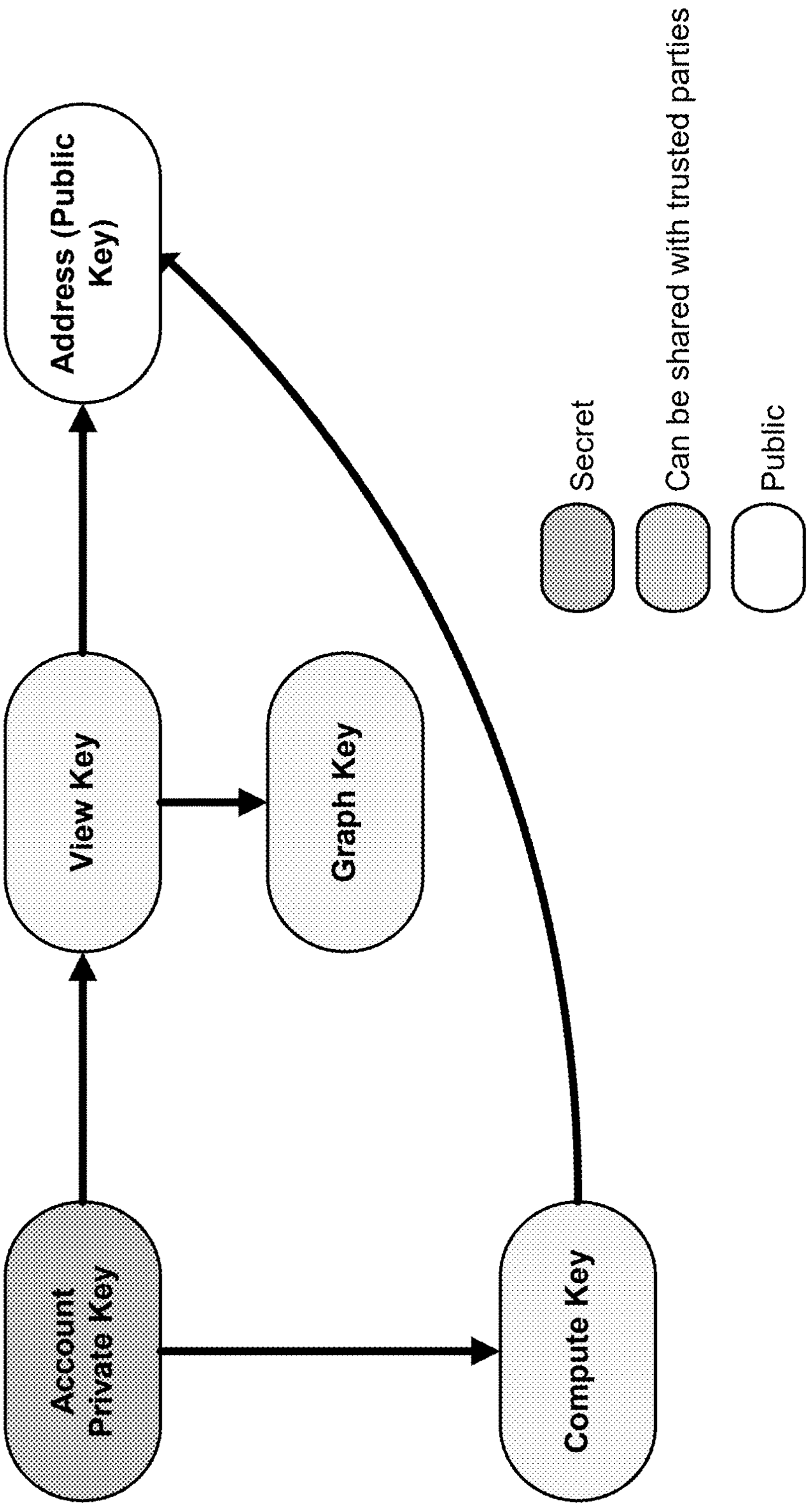
FIG. 3 is a diagram showing derivation paths of keys from the account private key corresponding to an account in accordance with some embodiments.

FIG. 3 is a diagram showing derivation paths of keys from the account private key corresponding to an account in accordance with some embodiments. As described above, the account private key of an account is capable of authorizing transactions (e.g., spend of tokens or authorizations of smart contracts) on behalf of the account among other functions and is therefore highly sensitive and should be kept secret by the account holder (not shared with any other party). The compute key can be derived directly from the account private key and the compute key can be used to validate a signature associated with a created transaction. The compute key can be shared with a trusted third party to perform the validation of the signature (e.g., during the process of generating a zero-knowledge proof). The account private key cannot be recovered from the compute key because it is mathematically improbable to recreate the account private key using the compute key, as shown in further detail. The view key can be derived directly from the account private key and the view key can be used to view a transaction to which the account holder is a recipient. The view key can be shared with a trusted third party to monitor confirmed transactions to determine those for which the account holder is a recipient. The account private key cannot be recovered from the view key because it is mathematically improbable to recreate the account private key using the view key, as shown in further detail below. The graph key can be derived from the view key and can be used to identify transactions with tags that are generated using the graph key. The account private key cannot be recovered from the graph key because the graph key is derived from the view key, which cannot be used to recover the account private key. The address (the public key) of the account can be derived either from the compute key or the view key. The address is the public identifier of the account and can be shared with any party (e.g., so that the other party can perform a transaction with the account as the recipient). The account private key cannot be recovered from the address because the address is derived from the view key or the compute key, either of which cannot be used to recover the account private key.

The private key and address are the secret and public key for an elliptic-curve-based signature scheme. In some embodiments, the private key is able to sign on behalf of the address, and the view key is able to decrypt on behalf of the address. The address is associated with the signature, and the address is used to encrypt arbitrary data. The view key and address are the asymmetric public key scheme, where the view key is the decryption key and the address is encryption key.

As shown in FIG. 3, by making the address (public key) of the account indirectly derived from the account private key, the address becomes decoupled from the private key. Also, it becomes even more mathematically improbable and practically impossible to recover the account private key from the address, which bolsters the security of the sensitive account private key. Furthermore, the key relationships/derivations as shown in FIG. 3 illustrate how different authorities that can be wielded by the account private key can be split across multiple derivative keys to allow the derivative keys to be delegated to (e.g., different) trusted parties to allow the delegates to perform tasks associated with individual authorities.

The following are examples of generating the account private key and the derivation of keys from the account private key in accordance with some embodiments:

The descriptions below make use of the following definitions of mathematical objects:

Prime finite fields: for a prime r, a finite field $\mathbb{F}_r$ consists of the integers {0, 1, . . . , r}. $\mathbb{F}_r$ has two associated operations: addition modulo r, and multiplication modulo r. In this document, we will use two prime finite fields: $\mathbb{F}_{scalar}$, of prime order p, and $\mathbb{F}_{base}$, of prime order q. In some embodiments, q>p.

Prime-order elliptic-curve groups: In this document, we will consider the order-p subgroup of points on an elliptic curve defined over the base field $\mathbb{F}_{base}$. Elements of this subgroup consist of a coordinate pair (x, y). The group has two associated operations: point addition, and point doubling. The group also has a distinguished point, the generator G, which is a fixed point of the group. In some embodiments, generator is G derived by using a "HashToCurve" algorithm, but any arbitrary point in the prime-order subgroup suffices.

HashToField$_{\mathbb{F}}$: For a finite field $\mathbb{F}$, HashToField$_{\mathbb{F}}$ is a cryptographic hash function that takes as input either a sequence of bytes or a sequence of $\mathbb{F}$ elements, and outputs elements of $\mathbb{F}$.

HashToScalar: an instantiation of HashToField that output elements in the scalar field $\mathbb{F}_{scalar}$. In some embodiments, HashToScalar function is the "Poseidon" hash function (with operations over $\mathbb{F}_{base}$), and the output is truncated to fit in $\mathbb{F}_{scalar}$. In some other embodiments, HashToScalar function comprises other cryptographic hash functions like SHA256 or SHA512, for example.

EncodeToF($\mathbb{F}$,x) is a function that encodes the bitstring x as an element of the finite field $\mathbb{F}$.

Account Private Key Generation

In some embodiments, an account private key can be generated to include two components ($sk_{sig}$,$r_{sig}$), which is become a member of $\mathbb{F}_{base}$ by being divided by q and, as a result, its remainder value is a value within the $\mathbb{F}_{base}$ base field {0, 1, . . . , q−1}. That remainder within the $\mathbb{F}_{base}$ base field is then concatenated with the "seed" value and the concatenation is input into the HashToScalar( ) function to map the input to a member of the $\mathbb{F}_{scalar}$ scalar field {0, 1, . . . , p−1}, where q and p are both prime and q>p.

3. $r_{sig}$=HashToScalar(seed||EncodeToF($\mathbb{F}_{base}$,"AccountSignatureRandomizer0_0")) // The sequence of bytes (which forms an integer) that comprises the ASCII encoding of the predetermined value of "AccountSignatureRandomizer0_0" is encoded to become a member of $\mathbb{F}_{base}$ by being divided by q and, as a result, its remainder value is a value within the $\mathbb{F}_{base}$ base field {0, 1, . . . , q−1}. That remainder within the $\mathbb{F}_{base}$ base field is then concatenated with the "seed" value and the concatenation is input into the HashToScalar( ) function to map the input to a member of the $\mathbb{F}_{scalar}$ scalar field {0, 1, . . . , p−1}. An alternative derivation of $r_{sig}$ can be $r_{sig}$=seed||$counter_{sig}$, where "$counter_{sig}$" is a predetermined value.
4. Output (seed, ($sk_{sig}$,$r_{sig}$)) // "Seed" is a member of the $\mathbb{F}_{base}$ base field {0, 1, . . . , q−1} and each of $sk_{sig}$ and $r_{sig}$ is a member of the $\mathbb{F}_{scalar}$ scalar field {0, 1, . . . , p−1}. Each of the seed and $sk_{sig}$ and $r_{sig}$ can be represented using 32 bytes.

Variant B, as will be described below, is similar to Variant A, except that it includes an additional component, $sk_{vrf}$.

Variant B ($sk_{sig}$,$r_{sig}$,$sk_{vrf}$)

function PrivateKey.New( ):

1. Seed←$F_{base}$ // Same as for Variant A $$sk_{sig} = HashToScalar(\text{seed}\|EncodeToF(\mathbb{F}_{base}, \text{"}AccountSignatureSecretKey0\text{"}))// \text{ Same as for Variant } A. \quad 2.$$

$$r_{sig} = HashToScalar(\text{seed}\|EncodeToF(\mathbb{F}_{base}, \text{"AccountSignatureRandomizer0\_0"}))// \text{ Same as for Variant } A. \quad 3.$$

$$sk_{vrf} = HashToScalar(\text{seed}\|EncodeToF(\mathbb{F}_{base}, AccountVRFSecretKey0\text{"}))//\text{The sequence of bytes.} \quad 4$$

referred to as "Variant A." In some other embodiments, an account private key can be generated to include three components ($sk_{sig}$,$r_{sig}$,$sk_{vrf}$), which is referred to as "Variant B." Each variant of the account private key will have corresponding derivations for the compute key, the view key, the graph key, and the address. Both Variants A and B are described below:

Variant $A(sk_{sig}, r_{sig})$ function PrivateKey.New( ):

1. Seed← $\mathbb{F}_{base}$ // A "seed" is sampled from a base field {0, 1, . . . , q} by selecting a random value from the $\mathbb{F}_{base}$ base field.
2. $sk_{sig}$=HashToScalar(seed||EncodeToF($\mathbb{F}_{base}$,"AccountSignatureSecretKey0")) // The sequence of bytes (which forms an integer) that comprises the ASCII encoding of the predetermined value of "AccountSignatureSecretKey0" is encoded to (which forms an integer) that comprises the ASCII encoding of the predetermined value of "AccountVRFSecretKey0" is encoded to become a member of $\mathbb{F}_{base}$ by being divided by q and, as a result, its remainder value is a value within the $\mathbb{F}_{base}$ base field {0, 1, . . . , q−1}. That remainder within the $\mathbb{F}_{base}$ base field is then concatenated with the "seed" value and the concatenation is input into the HashToScalar( ) function to map the input to a member of the $\mathbb{F}_{scalar}$ scalar field {0, 1, . . . , p−1}.

5. Output (seed, ($sk_{sig}$,$r_{sig}$,$sk_{vrf}$)) // Seed is a member of the $\mathbb{F}_{base}$ base field {0, 1, . . . , q−1} and each of $sk_{sig}$, $r_{sig}$, and $sk_{vrf}$ is a member of the $\mathbb{F}_{scalar}$ scalar field {0, 1, . . . , p−1}. Each of the seed and $sk_{sig}$, $r_{sig}$, and $sk_{vrf}$ can be represented using 32 bytes.

In some embodiments, the components $sk_{sig}$ and $r_{sig}$ of any variant of the account private key can be used to authorize a transaction from the associated account holder because these components (along with generator G) can be used to generate a signature corresponding to the transaction. Then, this signature will ultimately be used to verify the transaction on the blockchain.

Compute Key Generation

In some embodiments, a compute key associated with an account private key can be generated based on two components ($sk_{sig}$,$r_{sig}$), which is derived from "Variant A" of the account private key, as described above. In some embodiments, a compute key associated with an account private key can be generated based on three components ($sk_{sig}$,$r_{sig}$,$sk_{vrf}$), which is derived from "Variant B" of the account private key, as described above.

Variant A ($sk_{sig}$,$r_{sig}$)

function ComputeKey.FromPrivateKey($sk_{sig}$,$r_{sig}$):

1. $key_{compute}$=($sk_{sig}$·G,$r_{sig}$·G) // As mentioned above, G is a selected generator on an elliptic curve and so every other element of the elliptic curve can be obtained by applying a group operation repeatedly on G. Scalar multiplication $sk_{sig}$·G is adding G to itself $sk_{sig}$ times. Scalar multiplication $r_{sig}$·G is adding G to itself $r_{sig}$ times. Because G is a group element comprising an (x, y) coordinate, the result of each scalar multiplication is also a (x, y) coordinate, where each of x and y is a member from the $\mathbb{F}_{base}$ base field {0, 1, . . . , q−1}.
2. Output $key_{compute}$ // The $key_{compute}$ comprises two group elements. Specifically, each group element is a corresponding (x, y) coordinate and where each of x and y is a member from the $\mathbb{F}_{base}$ base field {0, 1, . . . , q−1}. Each element (x or y coordinate) of $key_{compute}$ can be represented using 32 bytes.

The compute key associated with Variant B, as will be described below, is similar to Variant A, except that it includes an additional component, $sk_{vrf}$.

Variant B ($sk_{sig}$,$r_{sig}$,$sk_{vrf}$)

function ComputeKey.FromPrivateKey($sk_{sig}$,$r_{sig}$,$sk_{vrf}$):

1. $key_{compute}$=($sk_{sig}$·G,$r_{sig}$·G,$sk_{vrf}$·G) // Similar to Variant A but includes an additional component that is a scalar multiplication of $sk_{vrf}$·G.
2. Output $key_{compute}$ // The $key_{compute}$ comprises three group elements. Specifically, each group element is a corresponding (x, y) coordinate and where each of x and y is a member from the $\mathbb{F}_{base}$ base field {0, 1, . . . , q−1}. Each element (x or y coordinate) of $key_{compute}$ can be represented using 32 bytes.

Account View Key Generation

In some embodiments, a view key associated with an account private key can be generated based on two components ($sk_{sig}$,$r_{sig}$), which is derived from "Variant A" of the account private key, as described above. In some embodiments, a view key associated with an account private key can be generated based on three components ($sk_{sig}$,$r_{sig}$,$sk_{vrf}$), which is derived from "Variant B" of the account private key, as described above.

Variant A ($sk_{sig}$,$r_{sig}$)

function ViewKey.FromPrivateKey($sk_{sig}$,$r_{sig}$):

1. $key_{view}$=$sk_{sig}$+$r_{sig}$+HashToScalar($sk_{sig}$·G||$r_{sig}$·G) // "$sk_{sig}$·G||$r_{sig}$·G" performs separate concatenations of the x components and y components on the products from the respective scalar multiplications of $sk_{sig}$·G and $r_{sig}$·G. The resulting concatenated group element comprising (x, y) is then input into the HashToScalar( ) function to output a member of the $\mathbb{F}_{scalar}$ scalar field {0, 1, . . . , p−1}. The remainder of sum of $sk_{sig}$+$r_{sig}$+HashToScalar($sk_{sig}$·G||$r_{sig}$·G) divided by p is the view key, $key_{view}$, which is a member of the $\mathbb{F}_{scalar}$ scalar field {0, 1, . . . , p−1}.
2. Output $key_{view}$ // The $key_{view}$ is a member of the $\mathbb{F}_{scalar}$ scalar field {0, 1, . . . , p−1}. The $key_{view}$ can be represented using 32 bytes.

The compute key associated with Variant B, as will be described below, is similar to Variant A, except that it includes an additional component, $sk_{vrf}$.

Variant B ($sk_{sig}$,$r_{sig}$,$sk_{vrf}$)

function ViewKey.FromPrivateKey($sk_{sig}$,$r_{sig}$,$sk_{vrf}$):

1. $key_{view}$=$sk_{sig}$+$r_{sig}$+HashToScalar ($sk_{sig}$·G||$r_{sig}$·G||$sk_{vrf}$·G) //"$sk_{sig}$·G||$r_{sig}$·G||$sk_{vrf}$·G" performs separate concatenations of the x components and y on the products from the respective scalar multiplications of $sk_{sig}$·G,$r_{sig}$·G, and $sk_{vrf}$·G. The resulting concatenated group element comprising (x, y) is then input into the HashToScalar( ) function to output a member of the $\mathbb{F}_{scalar}$ scalar field {0, 1, . . . , p−1}. The remainder of sum of $sk_{sig}$+$r_{sig}$+HashToScalar($sk_{sig}$·G||$r_{sig}$·G) divided by p is the view key, $key_{view}$, which is a member of the $\mathbb{F}_{scalar}$ scalar field {0, 1, . . . , p−1}.
2. Output $key_{view}$ // The $key_{view}$ is a member of the $\mathbb{F}_{scalar}$ scalar field {0, 1, . . . , p−1}. The $key_{view}$ can be represented using 32 bytes.

Graph Key Derivation

In some embodiments, a graph key associated with an account private key can be generated based on the view key that is derived from "Variant A" of the account private key, as described above. In some embodiments, a graph key associated with an account private key can be generated based on the view key that is derived from "Variant B" of the account private key, as described above.

Variants A and B function GraphKey.FromPrivateKey($key_{view}$):

1. $key_{graph}$=HashToBase(EncodeToF( $\mathbb{F}_{base}$,"GraphKey0")||$key_{view}$||counter) // The sequence of bytes (which forms an integer) that comprises the ASCII encoding of the predetermined value "GraphKey0" is encoded to become a member of $\mathbb{F}_{base}$ by being divided by q and, as a result, its remainder value is a value within the $\mathbb{F}_{base}$ base field {0, 1, . . . , q−1}. Next, that remainder is concatenated with the key value ($key_{view}$) (which could have been derived from either Variant A or B of the account private key) and the value "counter," which is a selected predetermined member in the $\mathbb{F}_{base}$ base field {0, 1, . . . , q−1}. In some embodiments, "counter" is also provided as an input parameter to the GraphKey.FromPrivateKey( ) function. The concatenation is then hashed using function HashToBase( ) to determine the graph key, $key_{graph}$.
2. Output $key_{graph}$ // The key graph is a member in the $\mathbb{F}_{base}$ base field {0, 1, . . . , q−1} and can be represented using 32 bytes.

Account Address

In some embodiments, an account address associated with an account private key can be generated based on the view key that is derived from "Variant A" of the account private key, as described above. In some embodiments, an account address associated with an account private key can be generated based on the view key that is derived from "Variant B" of the account private key, as described above.

Variants A and B function Address.FromPrivateKey($key_{view}$):

1. address=$key_{view}$·G // The view key, $key_{view}$, is a scalar multiplied by G, which is a selected point ((x, y) coordinate) on an elliptic curve.
2. Output address // The account address, address, is a group element comprising of a (x, y) coordinate and where each element (x or y) comprises a member of the $\mathbb{F}_{base}$ base field {0, 1, . . . , q−1}. Each element can be represented using 32 bytes.

In some embodiments, an account address associated with an account private key can be generated based on the compute key that is determined from "Variant A" of the account private key, as described above. In some embodiments, an account address associated with an account private key can be generated based on the compute key that is determined from "Variant B" of the account private key, as described above.

Variant A ($sk_{sig}$,$r_{sig}$)

$$\text{function Address.}\mathit{FromComputeKey}(\text{key}_{compute} = (sk_{sig}\cdot G,\ r_{sig}\cdot G)):$$

1. s=HashToScalar($sk_{sig}$·G||$r_{sig}$·G) // The concatenation of $sk_{sig}$·G and $r_{sig}$·G are input into the HashToScalar function to output a s from the $\mathbb{F}_{scalar}$ scalar field {0, 1, . . . , p−1}.
2. address=$sk_{sig}$·G+$r_{sig}$·G+s·G/The sum of $sk_{sig}$·G+$r_{sig}$·G+s·G is the address. In some embodiments, the sum of $sk_{sig}$·G+$r_{sig}$·G+s·G is divided by q to obtain a value from the $\mathbb{F}_{base}$ scalar field {0, 1, . . . , q−1} to serve as the address.
3. Output address // The account address, address, is a group element comprising of a (x, y) coordinate and where each element (x or y) comprises a member of the $\mathbb{F}_{base}$ base field {0, 1, . . . , q−1}. Each element can be represented using 32 bytes.

Variant B ($sk_{sig}$,$r_{sig}$,$sk_{vrf}$)

$$\text{function Address.}\mathit{FromComputeKey}(\text{key}_{compute} = (sk_{sig}\cdot G,\ r_{sig}\cdot G,\ sk_{vrf}\cdot G)):$$

$$s = \mathit{HashToScalar}(sk_{sig}\cdot G \| r_{sig}\cdot G \| sk_{vrf}\cdot G)//\text{Similar to Variant } A. \quad 1.$$

$$\text{address} = sk_{sig}\cdot G + r_{sig}\cdot G + s\cdot G//\text{Similar to Variant } A. \quad 2.$$

3. Output address

Figure 4:
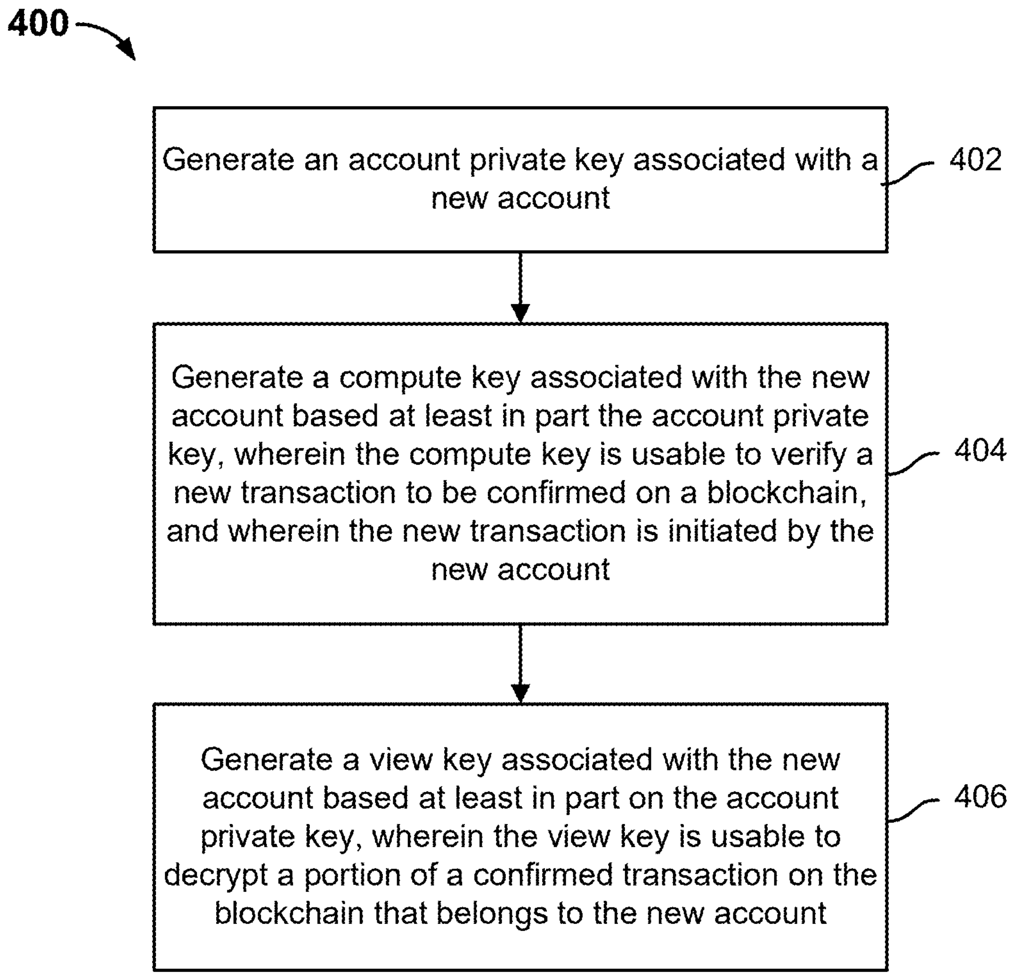
FIG. 4 is a flow diagram showing an embodiment of a process for deriving keys for managing an account.

FIG. 4 is a flow diagram showing an embodiment of a process for deriving keys for managing an account. In some embodiments, process 400 can be implemented at a client device such as client device 102 of FIG. 1.

At 402, an account private key associated with a new account is generated. In response to a request to generate a new account that is received at a client device, an account private key is generated at the client device.

At 404, a compute key associated with the new account is generated based at least in part on the account private key, wherein the compute key is usable to verify a new transaction to be confirmed on a blockchain, and wherein the new transaction is initiated by the new account. A compute key is derived from the account private key in a manner that the account private key is not mathematically likely to be recovered from the compute key. As such, an entity that receives only the compute key cannot recover and therefore obtain the authorities associated with the account private key. In some embodiments, the compute key corresponding to the new account is used to validate a signature (e.g., which is generated using the account private key) corresponding to a transaction that is initiated by the new account holder based at least in part on a portion of the transaction. In some embodiments, the signature, the compute key, and at least some of the records of the transaction are used to generate a zero-knowledge proof to be associated with the transaction. Such a zero-knowledge proof proves to a verifier that the input record(s) exist (were generated as the outputs of a previously confirmed transaction), the serial number of these input record(s) is derived correctly, and the signature corresponding to these input record(s) is correct. The zero-knowledge proof also ensures that the output records are constructed correctly. Furthermore, the zero-knowledge proof hides from the verifier which input record(s) were used, the signature, the compute key, and addresses of input records, and the contents of all the records. The zero-knowledge proof is then added into the transaction before it is sent to the blockchain network at which the nodes of the blockchain network will verify at least the zero-knowledge proof during the process of confirming whether the output records of the transaction should be added to the ledger of the blockchain.

At 406, a view key associated with the new account is generated based at least in part on the account private key, wherein the view key is usable to decrypt a portion of a confirmed transaction on the blockchain that belongs to the new account. The view key is derived from the account private key in a manner that the account private key is not mathematically likely to be recovered from the view key. As such, an entity that receives only the compute key cannot recover and therefore obtain the authorities associated with the account private key. In some embodiments, the view key corresponding to the new account is used to try to decrypt the encrypted output records of recently confirmed transactions on the blockchain. An output record of a transaction is encrypted using the account address (public key) of the recipient account of the output record and this encrypted output record can only be decrypted using the view key corresponding to the recipient account. As such, any output record that can be decrypted using the view key corresponding to the new account has designated the new account as the recipient to the output record.

Figure 5:
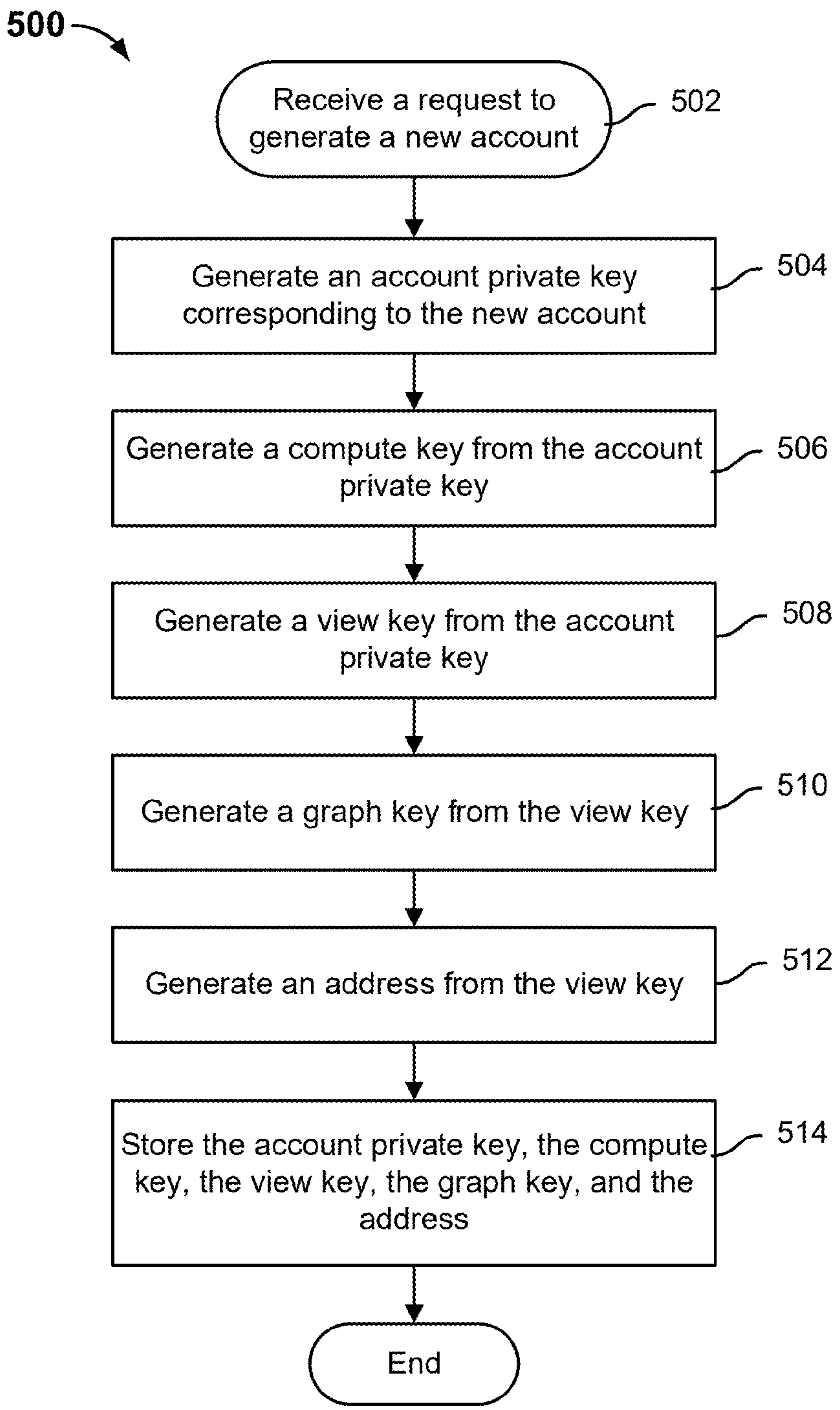
FIG. 5 is a flow diagram showing an example of a process for deriving keys from an account private key associated with an account in accordance with some embodiments.

FIG. 5 is a flow diagram showing an example of a process for deriving keys from an account private key associated with an account in accordance with some embodiments. In some embodiments, process 500 can be implemented at a client device such as client device 102 of FIG. 1. In some embodiments, process 400 of FIG. 4 can be implemented at least in part using process 500.

At 502, a request to generate a new account is received.

At 504, an account private key corresponding to the new account is generated.

The new account private key corresponding to the new account can be generated in accordance with the examples described above. The account private key should remain secret (e.g., not shared with anyone).

At 506, a compute key is generated from the account private key. The compute key corresponding to the new account can be derived from the account private key in accordance with the examples described above. The compute key can be shared with trusted parties.

At 508, a view key is generated from the account private key. The view key corresponding to the new account can be derived from the account private key in accordance with the examples described above. The view key can be shared with trusted parties.

At 510, a graph key is generated from the view key. The graph key corresponding to the new account can be derived from the view key in accordance with the examples described above. The graph key can be shared with trusted parties.

At 512, an address is generated from the view key. The address (public key) corresponding to the new account can be derived from the view key in accordance with the examples described above. The address can be publicly shared.

At 514, the account private key, the compute key, the view key, the graph key, and the address are stored. All the keys associated with the new account are stored so that they can be later retrieved to create transactions, view transactions, and analyze transactions either locally or via delegation to a trusted third-party (with except to the account private key, which should remain secret).

Figure 6:
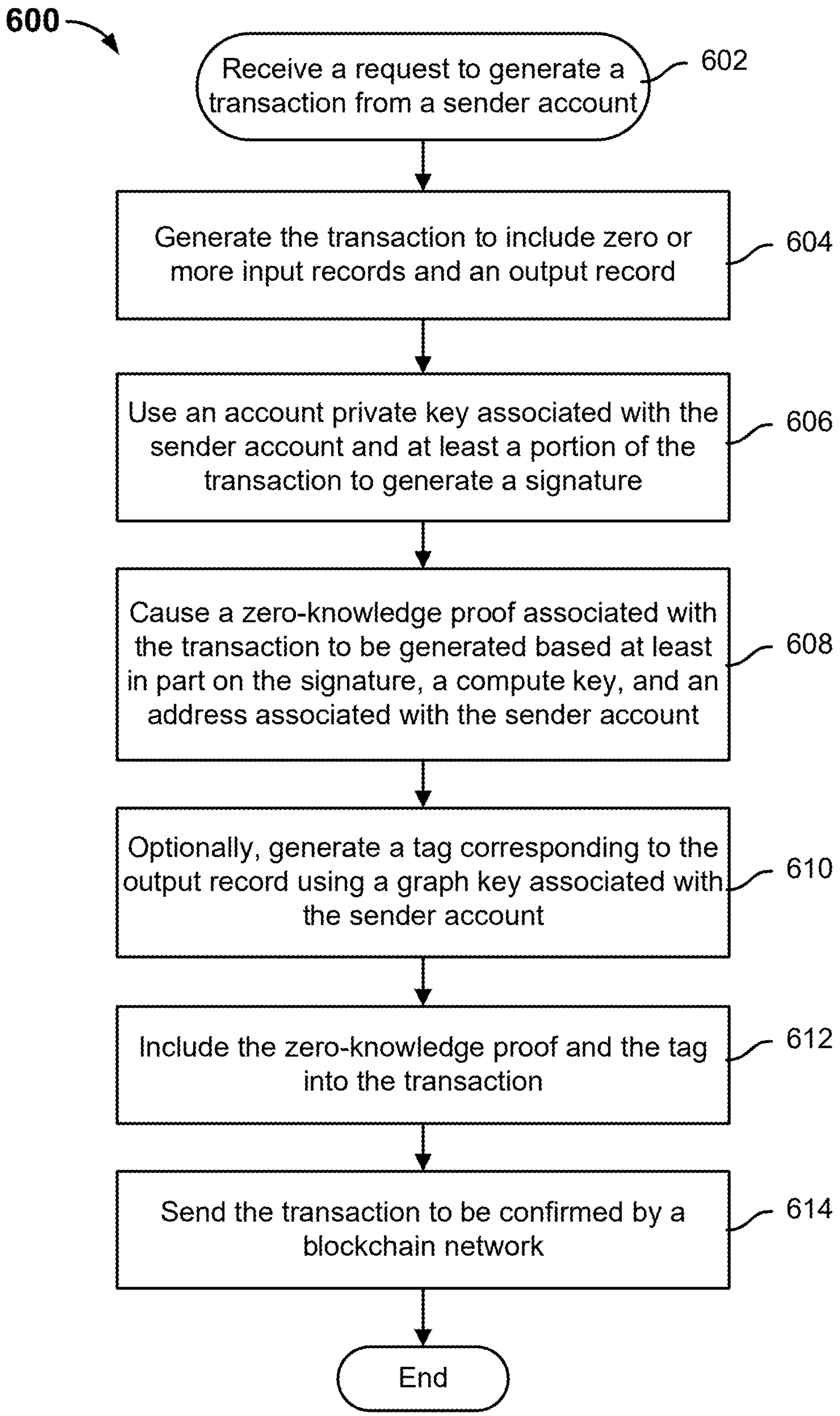
FIG. 6 is a flow diagram showing an example of a process for creating a transaction in accordance with some embodiments.

FIG. 6 is a flow diagram showing an example of a process for creating a transaction in accordance with some embodiments. In some embodiments, process 600 can be implemented at a client device such as client device 102 of FIG. 1.

At 602, a request to generate a transaction from a sender account is received. A request to generate a transaction from an account, the sender account, is received.

At 604, the transaction is generated to include zero or more input records and an output record. Depending on the nature of the transaction, zero or more confirmed records, which are records that were output records of transactions that have been confirmed on the blockchain are selected by the account holder to be included in the transaction. For example, an input record can establish the basis from which the transaction is to be performed, such as, for example, an amount of tokens that the sender account possesses in a transaction that involves sending tokens to a recipient account. However, where the transaction does not rely on a previous record (e.g., such as the minting the first tokens of a new currency), the transaction can have no input records. The account holder also provides an output record that documents the nature of the intended transaction, and in particular, specifies the account address of the recipient and a program (e.g., function) to be performed. The output record is also encrypted using the account address of the recipient party that is included in the output record itself.

At 606, an account private key associated with the sender account and at least a portion of the transaction are used to generate a signature. In various embodiments, a signature corresponding to the transaction can be generated by inputting the account private key (e.g., associated with the input record(s)) and at least a portion of the transactions (e.g., the input and output record(s) of the transaction) into a signature generation technique. In particular, in some embodiments, the account private key can be used to authorize the transaction based on the account holder using at least a portion of the components (e.g., $sk_{sig}$,$r_{sig}$) of the account private key to generate a signature and a unique serial number associated with the input record(s) of a transaction. As described below, the signature is then used to generate the zero-knowledge proof to be included in the transaction.

For example, if the sender account initiated a transaction to send 10 tokens to a recipient party, then the input record(s) in this current transaction could be output records of previously confirmed transactions on the blockchain that document that the sender account possesses at least 10 tokens. Each input record includes a tuple comprising the account address of the sender, a program related to the spending, and data specifying the amount of tokens that were transferred to the sender account. The sender account's account private key is used to generate a signature associated with the transaction and it is also used to generate a serial number to be associated with the input record. The output record in this transaction documents the intended transfer of 10 tokens to the recipient account. The output record includes a tuple comprising the account address of the recipient, a program related to the spending, and data specifying that 10 tokens are to be transferred to the recipient account. The output record is also encrypted using the account address of the recipient so that only parties with the view key belonging to the recipient account can decrypt and view that 10 tokens are sent by the sender account to the recipient account in this record/transaction. The output record will be confirmed and added to the ledger of valid records once the transaction is published to and then verified by the blockchain network.

At 608, a zero-knowledge proof associated with the transaction is caused to be generated based at least in part on the signature, the compute key, and an address associated with the sender account. In various embodiments, a zero-knowledge proof that proves that the transaction was initiated by the sender account (and not a fraudulent actor) is generated by inputting the signature, the compute key, and the account address of the sender account into a zero-knowledge proof technique. The compute key and the address of the sender account will verify the signature associated with the transaction as belonging to the sender account. In some embodiments, at least some portion of the zero-knowledge proof generation process is delegated to a third-party server to free up computing resources at the client device.

At 610, optionally, a tag corresponding to the output record is generated using a graph key associated with the sender account. In some embodiments, the tag can be specific to a particular output record. In some embodiments, the tag is general to the entire transaction. In some embodiments, the tag is generated as a "HashToBase(record_commitment_i||graph_key)" and where the record_commitment_i is the commitment to the $i^{th}$ input record At 612, the zero-knowledge proof and the tag are included in the transaction.

At 614, the transaction is sent to be confirmed by a blockchain network. The zero-knowledge proof will be used by the blockchain network to determine whether to confirm the transaction and add the included output record(s) to list of valid output records (the ledger). In some embodiments, in addition to using the zero-knowledge proof to confirm the transaction, the blockchain network also checks whether a unique serial number associated with each input record of the transaction is associated with any previously confirmed transaction (e.g., because if so, then the input record could not be consumed/spent again) before confirming the transaction. The tag can be used by an entity that possesses a copy of the graph key to re-generate the tag and to use the tag to identify transactions related to the account for the purpose of analyzing the transactions for trends and/or anomalous behavior.

Figure 7:
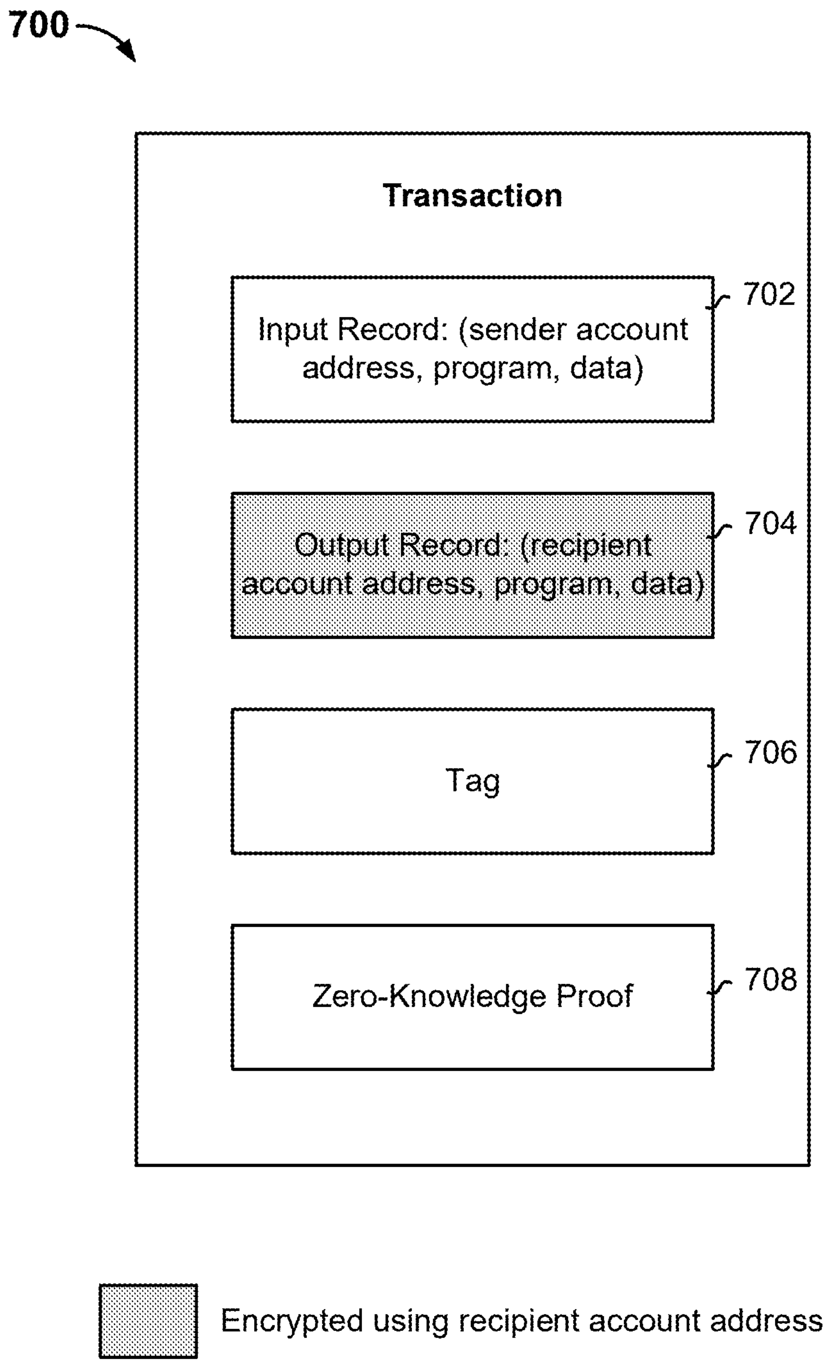
FIG. 7 is a diagram showing an example of a transaction that is created by a sender account in accordance with some embodiments.

FIG. 7 is a diagram showing an example of a transaction that is created by a sender account in accordance with some embodiments. In some embodiments, transaction 700 can be created using a process such as process 600 of FIG. 6. Transaction 700 includes input record 702, which includes at least the following tuple (sender account address, program, data). Input record 702 was an output record that was included in a transaction that was previously confirmed at the blockchain and as such, input record 702 is a valid input record that can provide the basis for a transaction. The "sender account address" is the account address/public key of the sender account that initiated the creation of transaction 700. The "program" of input record 702 specified a program (function) that was performed when input record 702 was consumed/spent, and the "data" of input record 702 is the data that input record 702 is recording. Transaction 700 includes output record 704, which describes the desired transaction to be performed by the sender account with respect to a recipient account. Output record 704 includes at least the following tuple (recipient account address, program, data). Unlike input record 702, output record 704 is not valid until transaction 700 is confirmed by the blockchain. The "recipient account address" is the account address/public key of the recipient account of transaction 700. The "program" of output record 704 specifies a program (function) that is to be performed when output record 704 is consumed/spent, and the "data" of input record 702 is the data that output record 704 is recording. Furthermore, output record 704 would also be encrypted using the recipient account address, which is also the first member of its tuple, so that output record 704 could only be successfully decrypted using the view key associated with the recipient account, as described above. Transaction 700 also includes tag 706, which is generated based on at least one or both of input record 702 and output record 704 and the graph key associated with the sender account. Transaction 700 further includes zero-knowledge proof 708, which is generated based on a signature, the compute key associated with the sender account, and the sender account address. In some embodiments, the signature was generated based on the account private key associated with the sender account and at least one or both of input record 702 and output record 704.

For example, if transaction 700 described the transfer of 10 tokens from the sender account to the recipient account, then input record 702 would document that the sender account has at least 10 tokens and output record 704 would document that the recipient account should receive 10 tokens.

After transaction 700 is generated, transaction 700 is sent/published to the blockchain network, which is configured to confirm whether to add output record 704 to the list of valid output records based at least on zero-knowledge proof 708 and a unique serial number associated with input record 702. Zero-knowledge proof 708 will prove to the blockchain network that the sender account had in fact authorized this transaction (e.g., spend of tokens) without revealing the compute key associated with the sender account. The blockchain network will use the unique serial number associated with input record 702 to confirm that input record 702 has not already been spent in another confirmed transaction (transaction 700 will only be confirmed if input record 702 was not previously consumed/spent in another transaction). Once the blockchain network confirms transaction 700, the blockchain network will add output record 704 to the list of valid output records and output record 704 can then be used/consumed/spent by the recipient account as an input record to a subsequent transaction.

Figure 8:
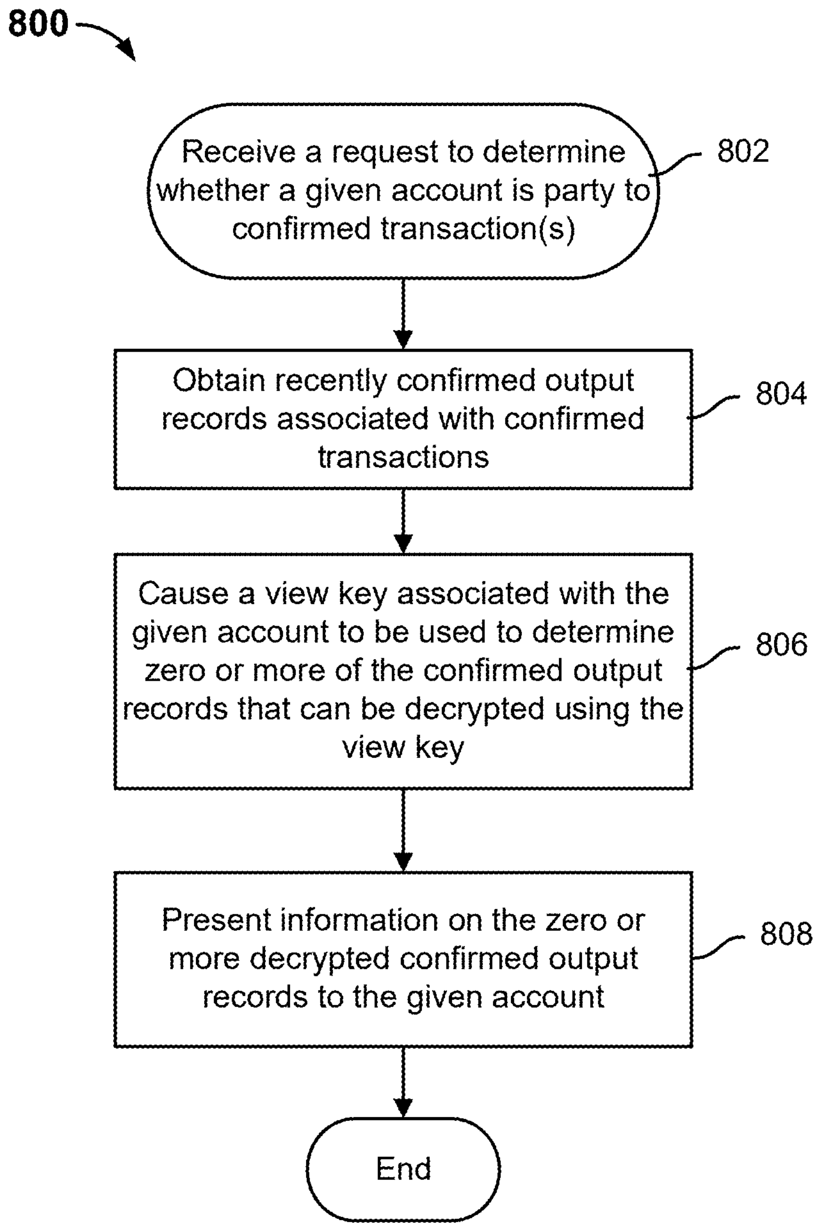
FIG. 8 is a flow diagram showing an example of a process for transaction viewing in accordance with some embodiments.

FIG. 8 is a flow diagram showing an example of a process for transaction viewing in accordance with some embodiments. In some embodiments, process 800 can be implemented at a client device such as client device 102 of FIG. 1. In some embodiments, process 800 can be implemented at a transactions scanning server such as transactions scanning server 106 of FIG. 1.

Process 800 can be performed at a client device that is used by the given account described below or it can be performed by a transactions scanning server to which the client device has delegated process 800 via the sharing of the view key associated with the given account.

At 802, a request to determine whether a given account is party to confirmed transaction(s) is received.

At 804, recently confirmed output records associated with confirmed transactions are obtained. Transactions that are sent to the blockchain network are confirmed over time and after transactions become confirmed, their output records are added to a list of valid/confirmed output records. Periodically or in response to a trigger/event, new output records that are added to the list are obtained to scan for transactions that are relevant to the given account.

At 806, a view key associated with the given account is caused to be used to determine zero or more of the confirmed output records that can be decrypted using the view key. As mentioned above, each output record has been encrypted with the recipient account address that is included in its tuple. The encrypted output record can only be decrypted using the view key of the recipient account address. As such, only obtained output records that have been encrypted using the address of the same account for which the view key is used for decryption can be decrypted by that view key. This type of asymmetric encryption allows only parties entrusted by an account with its view key to view transactions that are relevant to that account.

At 808, information on the zero or more decrypted confirmed output records is presented to the given account. For each decrypted output record, which is a record that is relevant to the given account, at least a portion of the data that is recorded by the recording is presented at a user interface for the user of the given account. For example, if the decrypted output record indicated that the given account received 10 tokens, then this information would be presented at a user interface for the account holder to view.

Figure 9:
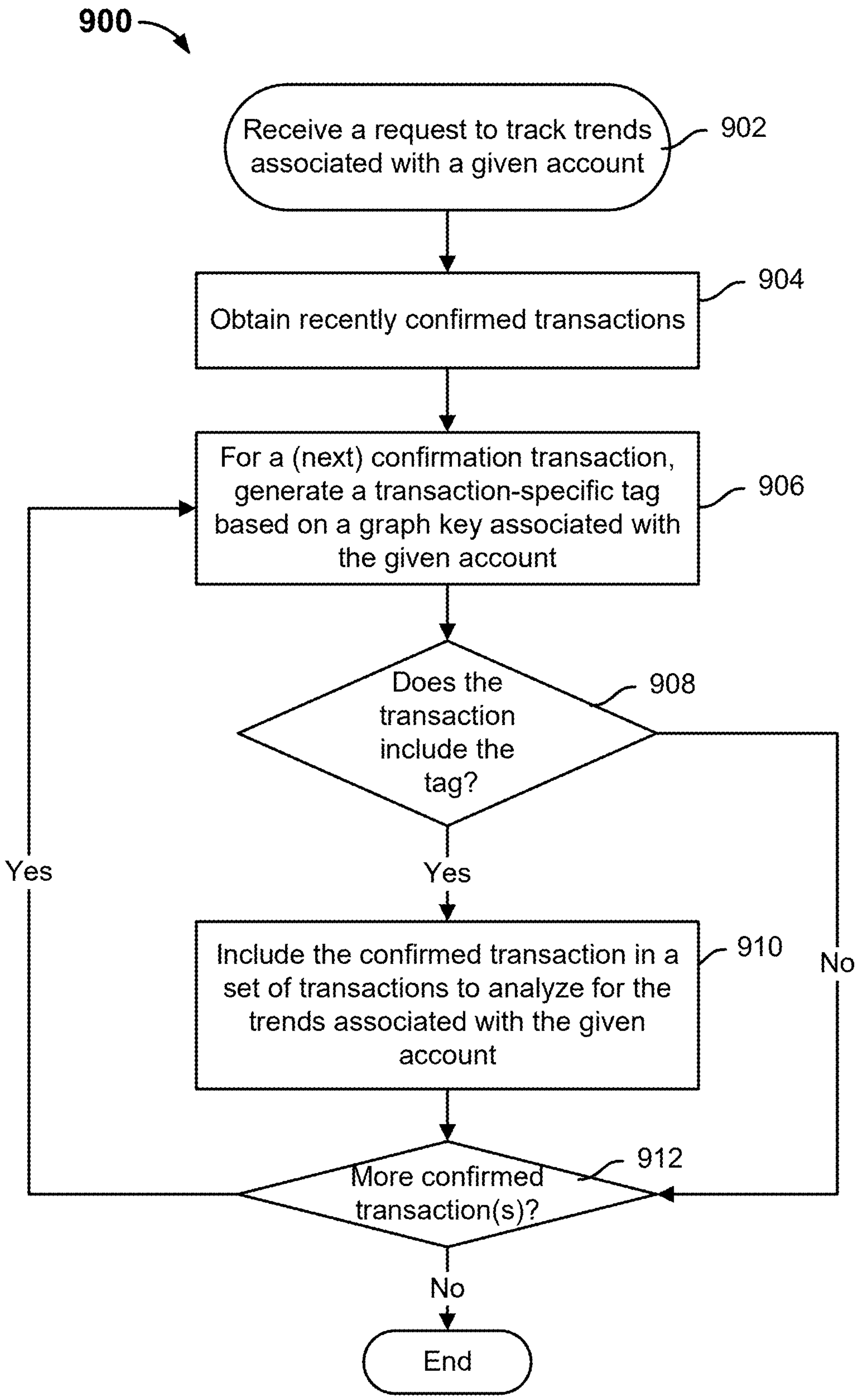
FIG. 9 is a flow diagram showing an example of a process for tacking trends in transactions in accordance with some embodiments.

FIG. 9 is a flow diagram showing an example of a process for tacking trends in transactions in accordance with some embodiments. In some embodiments, process 900 can be implemented at a client device such as client device 102 of FIG. 1. In some embodiments, process 900 can be implemented at a trends analysis server such as trends analysis server 108 of FIG. 1.

Process 900 can be performed at a client device that is used by the given account described below or it can be performed by a trends analysis server to which the client device has delegated process 900 via the sharing of the graph key associated with the given account.

At 902, a request to track trends associated with a given account is received.

At 904, recently confirmed transactions are obtained. Transactions that are sent to the blockchain network are confirmed over time and after transactions become confirmed, their output records are added to a list of valid/confirmed output records. Periodically or in response to a trigger/event, new output records that are added to the list are obtained to use to determine trends.

At 906, for a (next) confirmed transaction, a transaction-specific tag is generated based on a graph key associated with the given account. In some embodiments, the transaction-specific tag is generated based on the graph key as well as a portion of the transaction.

At 908, whether the confirmed transaction includes the transaction-specific tag is determined. In the event that the transaction includes the transaction-specific tag, control is transferred to 910. Otherwise, in the event that the transaction does not include the transaction-specific tag, control is transferred to 912. If the confirmed transaction included the computed tag, then it is determined that the transaction belongs to the given account.

At 910, the confirmed transaction is included in a set of transactions to analyze for trends associated with the given account. Transactions that are determined to include tags that are generated based on the graph key are those that are determined to be relevant to the given account. These relevant transactions can then be analyzed using clustering, machine learning, or another technique to determine general trends as well as for the potential presence of anomalous activity.

At 912, whether there is at least one more confirmed transaction is determined. In the event that there is at least one more confirmed transaction, control is returned to 906. Otherwise, in the event that there are no more confirmed transactions, process 900 ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more memories; and one or more processors coupled to the one or more memories and configured to:

receive, from a device, a view key associated with an account, wherein the view key is derived from an account private key associated with the account, wherein the account private key cannot be recovered from the view key;

obtain encrypted output records of confirmed transactions from a blockchain network;

determine an encrypted output record of the obtained encrypted output records corresponding to a corresponding confirmed transaction of the confirmed transactions can be decrypted with the view key, wherein the encrypted output record is encrypted using an account address of the account, and the account address is derived from the view key;

in response to decrypting the encrypted output record with the view key, determine that the corresponding confirmed transaction corresponding to the encrypted output record is relevant to the account and the account is a recipient of the corresponding confirmed transaction; and send a message that describes the corresponding confirmed transaction comprising a number of tokens sent to the account via the corresponding confirmed transaction to the device.

2. The system of claim 1, wherein the account address associated with the account is derived from the view key by the device.

3. The system of claim 1, wherein the view key associated with the account and the account address associated with the account comprises an asymmetric public key scheme, wherein the view key comprises a decryption key and the account address comprises an encryption key.

4. The system of claim 1, wherein to obtain the encrypted output records of the confirmed transactions from the blockchain network comprises to periodically download a new set of encrypted output records of new confirmed transactions from the blockchain network.

5. The system of claim 1, wherein to obtain the encrypted output records of the confirmed transactions from the blockchain network comprises to, in response to an event, download a new set of encrypted output records of new confirmed transactions from the blockchain network.

6. The system of claim 1, wherein the encrypted output record corresponding to the corresponding confirmed transaction comprises a first encrypted output record corresponding to a first corresponding confirmed transaction, and wherein the one or more processors are further configured to:

determine a second encrypted output record corresponding to a second corresponding confirmed transaction that cannot be decrypted with the view key; and determine that the second corresponding confirmed transaction corresponding to the second encrypted output record is not relevant to the account.

7. The system of claim 1, wherein a graph key associated with the account is derived from the view key by the device.

8. The system of claim 1, wherein to send the message that describes the corresponding confirmed transaction to the device comprises to generate a prompt that describes an amount of tokens sent to the account via the corresponding confirmed transaction.

9. The system of claim 1, wherein the decrypted encrypted output record corresponding to the corresponding confirmed transaction includes the account address of the account.

10. The system of claim 1, wherein the account private key is configured to authorize a transaction initiated from the account.

11. A method, comprising:

receiving, from a device, a view key associated with an account, wherein the view key is derived from an account private key associated with the account, wherein the account private key cannot be recovered from the view key;

obtaining encrypted output records of confirmed transactions from a blockchain network;

determining an encrypted output record of the obtained encrypted output records corresponding to a corresponding confirmed transaction of the confirmed transactions can be decrypted with the view key, wherein the encrypted output record is encrypted using an account address of the account, and the account address is derived from the view key;

in response to decrypting the encrypted output record with the view key, determining that the corresponding confirmed transaction corresponding to the encrypted output record is relevant to the account and the account is a recipient of the corresponding confirmed transaction; and sending a message that describes the corresponding confirmed transaction comprising a number of tokens sent to the account via the corresponding confirmed transaction to the device.

12. The method of claim 11, wherein the account address associated with the account is derived from the view key by the device.

13. The method of claim 9, wherein the view key associated with the account and the account address associated with the account comprises an asymmetric public key scheme, wherein the view key comprises a decryption key and the account address comprises an encryption key.

14. The method of claim 11, wherein obtaining the encrypted output records of the confirmed transactions from the blockchain network comprises periodically downloading a new set of encrypted output records of new confirmed transactions from the blockchain network.

15. The method of claim 11, wherein obtaining the encrypted output records of the confirmed transactions from the blockchain network comprises, in response to an event, downloading a new set of encrypted output records of new confirmed transactions from the blockchain network.

16. The method of claim 11, wherein the encrypted output record corresponding to the corresponding confirmed transaction comprises a first encrypted output record corresponding to a first corresponding confirmed transaction, and further comprising:

determining a second encrypted output record corresponding to a second corresponding confirmed transaction that cannot be decrypted with the view key; and determining that the second corresponding confirmed transaction corresponding to the second encrypted output record is not relevant to the account.

17. A computer program product comprising a non-transitory computer-readable storage medium having stored therein computer instructions that when executed by one or more processors, cause the one or more processors to perform operations comprising:

receiving, from a device, a view key associated with an account, wherein the view key is derived from an account private key associated with the account, wherein the account private key cannot be recovered from the view key;

obtaining encrypted output records of confirmed transactions from a blockchain network;

determining an encrypted output record of the obtained encrypted output records corresponding to a corresponding confirmed transaction of the confirmed transactions can be decrypted with the view key, wherein the encrypted output record is encrypted using an account address of the account, and the account address is derived from the view key;

in response to decrypting the encrypted output record with the view key, determining that the corresponding confirmed transaction corresponding to the encrypted output record is relevant to the account and the account is a recipient of the corresponding confirmed transaction; and sending a message that describes the corresponding confirmed transaction comprising a number of tokens sent to the account via the corresponding confirmed transaction to the device.

* * * * *